(12) United States Patent
Grebennikov et al.

(10) Patent No.: US 11,968,220 B2
(45) Date of Patent: Apr. 23, 2024

(54) SYSTEMS AND METHODS FOR PERFORMING FAILOVER DURING A CYBERATTACK

(71) Applicant: Acronis International GmbH, Schaffhausen (CH)

(72) Inventors: Nikolay Grebennikov, Moscow (RU); Candid Wüest, Bassersdorf (CH); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 318 days.

(21) Appl. No.: 17/520,828

(22) Filed: Nov. 8, 2021

(65) Prior Publication Data

US 2022/0201012 A1 Jun. 23, 2022

Related U.S. Application Data

(60) Provisional application No. 63/126,956, filed on Dec. 17, 2020.

(51) Int. Cl.
*H04L 29/06* (2006.01)
*H04L 9/40* (2022.01)

(52) U.S. Cl.
CPC ........ *H04L 63/1416* (2013.01); *H04L 63/101* (2013.01); *H04L 63/1425* (2013.01); *H04L 63/1466* (2013.01)

(58) Field of Classification Search
CPC ............... H04L 63/1416; H04L 63/101; H04L 63/1466; H04L 63/1425
USPC ......................................................... 726/22
See application file for complete search history.

(56) References Cited

U.S. PATENT DOCUMENTS 11,777,992 B1 * 10/2023 Cross ...................... H04L 63/20
726/5
2020/0120130 A1 * 4/2020 McArdle ............... G06F 9/4406

* cited by examiner

*Primary Examiner* — Lan Dai T Truong
(74) *Attorney, Agent, or Firm* — ArentFox Schiff LLP; Michael Fainberg

(57) ABSTRACT

Disclosed herein are systems and method for performing failover during a cyberattack. In one exemplary aspect, a method comprises monitoring a computing device for the cyberattack and detecting that the cyberattack is in progress. While the cyberattack is in progress, the method comprises identifying a failover device that corresponds to the computing device, hardening the failover device to prevent the cyberattack from affecting the failover device, and performing failover by switching from the computing device to the failover device.

20 Claims, 4 Drawing Sheets

SYSTEMS AND METHODS FOR PERFORMING FAILOVER DURING A CYBERATTACK

CROSS-REFERENCE TO RELATED APPLICATIONS

This application claims the benefit of U.S. Provisional Application No. 63/126,956, filed Dec. 17, 2020, which is herein incorporated by reference.

FIELD OF TECHNOLOGY

The present disclosure relates to the field of data security, and, more specifically, to systems and methods for performing failover during a cyberattack.

BACKGROUND

Failover refers to a mode in which a system automatically switches to a standby database, server, or network, if the system fails or is temporarily stopped for servicing. In a failover mode, system/user requests directed to the failed or downed system are thus redirected to the standby database, server, or network. In many instances the standby equipment is redundant (i.e., it mimics the original system). Accordingly, usage of the system from the perspective of a user is uninterrupted.

Failover completion of large servers, however, can take multiple hours. Because general disaster recovery is reactive to cyberattacks, a window of downtime after a cyberattack is expected even if failover is triggered immediately after the cyberattack is complete. In some cases, even the newly started servers (i.e., the standby equipment) are attacked and compromised as well.

There is thus a need to reduce the downtime caused by cyberattacks and prevent standby equipment from being affected by the cyberattack.

SUMMARY

To address these shortcomings, aspects of the disclosure describe methods and systems for performing failover during a cyberattack.

In one exemplary aspect, a method comprises monitoring a computing device for the cyberattack and detecting that the cyberattack is in progress. While the cyberattack is in progress, the method comprises identifying a failover device that corresponds to the computing device, hardening the failover device to prevent the cyberattack from affecting the failover device, and performing failover by switching from the computing device to the failover device.

In some aspects, the cyberattack is targeting a plurality of computing devices comprising the computing device. The method further comprises identifying a plurality of failover devices that correspond to the plurality of computing devices, hardening each failover device of the plurality of failover devices, and performing the failover by switching from the plurality of computing devices to the plurality of failover devices.

In some aspects, the method comprises determining an anticipated completion time of the cyberattack, and completing the failover before the anticipated completion time.

In some aspects, determining the anticipated completion time comprises determining a rate of change in performance of the computing device over a period of time, wherein the performance of the computing device is less than a threshold performance at the anticipated completion time, and extrapolating the rate of change over the period of time to determine the anticipated completion time.

In some aspects, the cyberattack is targeting a plurality of computing devices comprising the computing device, and determining the anticipated completion time comprises detecting a failure rate of the plurality of computing devices, wherein all of the plurality of computing devices will fail at the anticipated completion time, and extrapolating the failure rate to determine the anticipated completion time.

In some aspects, hardening the failover device to prevent the cyberattack from affecting the failover device comprises temporarily making the failover device read-only.

In some aspects, hardening the failover device to prevent the cyberattack from affecting the failover device comprises updating an access control list (ACL) and/or IP address restrictions list to prevent the cyberattack from accessing data on the failover device.

In some aspects, performing the failover by switching from the computing device to the failover device comprises redirecting requests sent from a client device to the computing device to the failover device.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for performing failover during a cyberattack. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to address the shortcomings described in the background, the present disclosure detects an ongoing cyberattack in progress and automatically performs failover to a hardened mirror site. Detection of the cyberattack may be based on suspicious alerts such as a sequence of anti-virus (AV) detections, endpoint detection and response (EDR) alerts, lateral movements, device shutdowns, service crashes, etc. The present disclosure ensures minimal service interruptions for client devices by having the new hardened site online before the cyberattack finishes (e.g., before ransomware encrypts all local servers in a network). Because a cyberattack may also target the failover site, prior to performing failover, aspects of the present disclosure implement hardening methods (e.g., applying extra firewall rules, making the site read-only, etc.).

Figure 1:
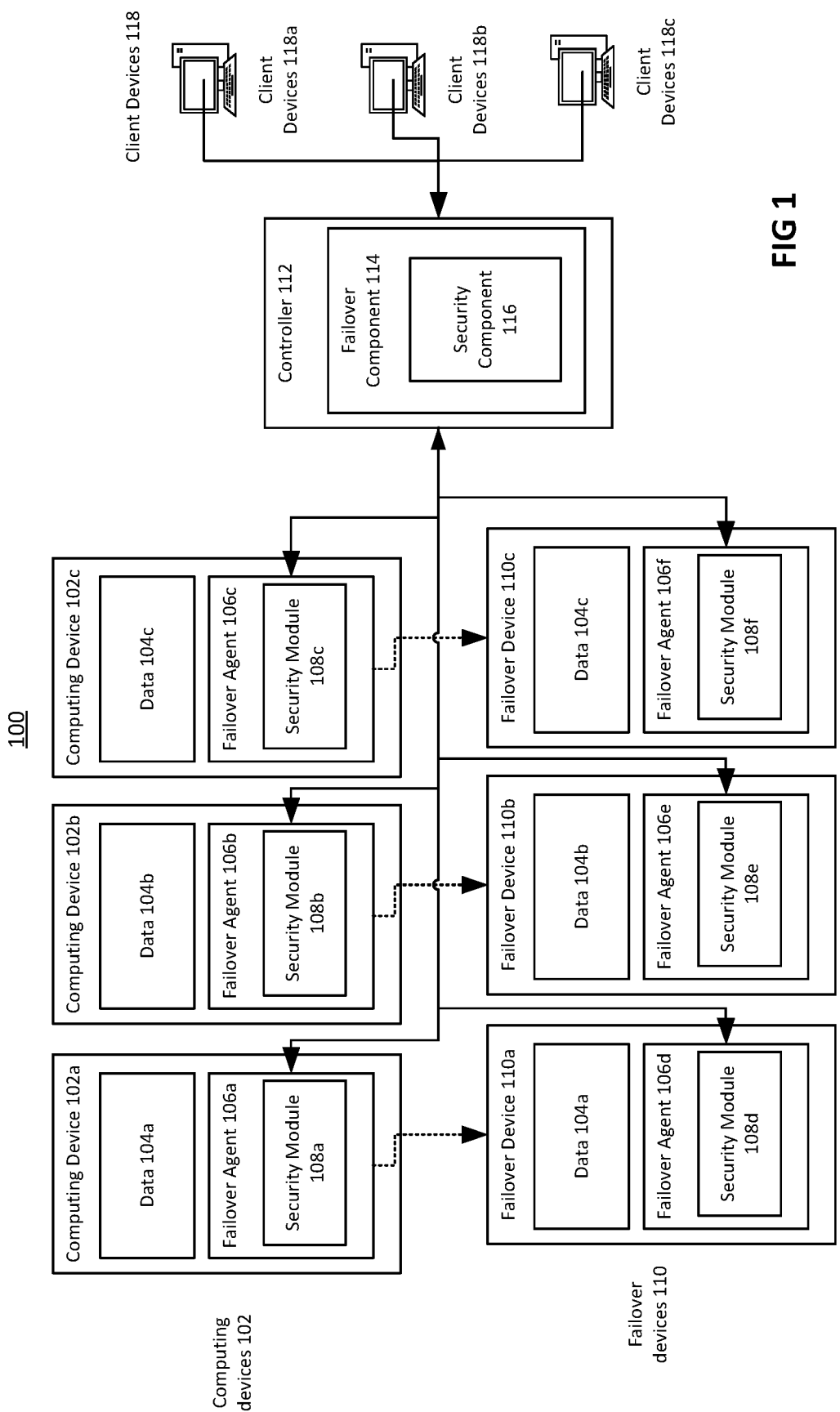
FIG. 1 is a block diagram illustrating a system for performing failover during a cyberattack.

FIG. 1 is a block diagram illustrating system 100 for performing failover during a cyberattack. System 100 includes computing devices (CDs) 102a, 102b, and 102c, which may be servers or computers that provide access to data 104a, 104b, and 104c, respectively, to client devices 118a, 118b, and 118c. For example, client device 118a may be a smartphone that is streaming a video (e.g., data 104b) from computing device 102b (e.g., a media server). CDs 102 correspond to failover devices (FDs) 110. In system 100, CD 102a corresponds to FD 110a, CD 102b corresponds to FD 110b, and CD 102c corresponds to FD 110c. It should be noted that only three CDs 102, FDs 110, and client devices 118 are shown for simplicity, but any number of those devices can be included in system 100.

If a certain CD fails, system 100 enters failover mode for that CD, wherein the corresponding FD is activated. For example, if client device 118b attempts to access data 104b from CD 102b when CD 102b is in failover mode, requests from client device 118b are redirected to FD 110b, which is a mirror copy of CD 102b (i.e., FD 110b also stores data 104b). In some aspects, this redirection may be facilitated by controller 112, which may be stored on another CD (not shown) of system 100 (e.g., requests received by failover component 114 that are directed to CD 102b are forwarded instead to FD 110b). In other aspects, this redirection may be facilitated by failover agent 106b and failover agent 106e (e.g., requests received by failover agent 106b are forwarded to failover agent 106e).

In an exemplary aspect, failover is performed during a cyberattack. Each failover agent on a CD or FD comprises a security module that monitors the respective CD or FD for the cyberattack. For example, a cyberattack may be ransomware that is configured to encrypt data to prevent access until a payment is made to the attacker. Suppose that security module 108a detects that a cyberattack is in progress on CD 102a. For example, security module 108a may detect the encryption of files in data 104a by an unauthorized entity (e.g., a hacker). Conventional systems wait for the attack to complete before initiating failover. In other words, the criteria for launching failover mode is dependent on a device failing. However, waiting for CD 102a to fail before switching to FD 110a will surely interrupt access to data 104a by a client device. Because failover can take a long period of time, failover should be perform as soon as possible in response to detecting an issue.

Thus, while the cyberattack is in progress, failover agent 106a may identify a FD that corresponds to the CD under attack. In the overarching example, failover agent 106a may be configured to receive an indication of the suspected attack by security module 108a and communicate immediately with failover agent 106d to activate failover mode. It is possible that because the CDs and FDs shown in FIG. 1 are part of the same system 110 (e.g., they may be part of the same network) the cyberattack may affect the other CDs and FDs as well. Accordingly, in addition to initiating failover mode in response to detecting that an attack is ongoing, when failover agent 106d receives an indication that an attack is happening at CD 102a, security module 108d may harden FD 110a to prevent the cyberattack from affecting FD 110a.

In some aspects, this hardening to prevent the cyberattack from affecting FD 110a comprises temporarily making FD 110a read-only. For example, security module 108d may make data 104a on failover device 110a read-only fora certain period of time. This period of time may be equal to the amount of time CD 102a is under attack or the amount of time until the cyberattack on CD 102a has been removed/ overcome. The period of time is important because FD devices cannot be made read-only by default. FD devices may need to regularly be updated to maintain redundancy and a premature conversion to read-only will prevent this. In some aspects, controller 112 is configured to optimize the period of time to reduce the time of interruption. For example, controller 112 or a security module on a FD device may utilize machine learning to determine a period of time (when and length) that write actions are not performed on a given FD device. Based on identifying a period of time (which may differ for each FD), the hardening technique may be utilized.

In some aspects, hardening to prevent the cyberattack from affecting FD 110a comprises updating an access control list (ACL) and/or IP address restrictions list to prevent the cyberattack from accessing data 104a on FD 110a. For example, security module 108d may store an ACL or and IP address restrictions list. In response to detecting an identifier or IP address associated with the cyberattack, the identifier and/or IP address may be added to the ACL and/or restrictions list, respectively. At a later time when FD 110a is activated and requests for data 104a are directed to FD 110a, security module 108d may determine where the requests are coming from (e.g., the source IP address) and either allow or deny the request. Because the cyberattack source is blacklisted, security module 108d prevents damage to FD 110a.

Subsequent to FD 110a being hardened, failover agent 106a may perform failover by switching from CD 102a to FD 110a. More specifically, failover agent 106a may redirect requests sent from a client device (e.g., 118a) to CD 102a to FD 110a. It should be noted that the configurations of failover agents and security modules of CD 102a and FD 110a also apply to CD 102b and 102c, as well as FD 110b and 110c (i.e., failover agents 106b, 106c, 106e, and 106f and security modules 108b, 108c, 108e, and 108f).

In some aspects, rather than the individual failover agents of a CD and a corresponding FD interacting with each other, determining when, where, and how to redirect requests is performed by controller 112. Controller 112 comprises failover component 114, which further comprises security component 116, which may detect a cyberattack on a CD. In some cases, security component 116 receives an indication of a cyberattack from a security module. In response to determining that the cyberattack is in progress, failover component 114 may identify a FD that corresponds to a CD (e.g., by referring to an internal database that makes the mapping) and may redirect all requests from a client device 118 to the failover agent of the FD. Furthermore, security component 116 may instruct the local security module on the FD to perform hardening actions.

In some aspects, a cyberattack may target a plurality of computing devices (e.g., 102a, 102b, and 102c). Controller 112 may identify a plurality of failover devices (e.g., 110a, 110b, and 110c, respectively) that correspond to the plurality of computing devices. Controller 112 may instruct each security module at each FD to harden the FD it is responsible for. For example, security component 116 may transmit hardening instructions for FD 110a to security module 108d. Subsequently, controller 112 may performing the failover by switching from the plurality of computing devices to the plurality of failover devices (i.e., forwarding all requests from client devices 118 to a respective FD).

As noted before, reducing the amount of time spent not fulfilling requests from client devices 118 is one objective of the present disclosure. Security component 116 or a security module (e.g., 108a) may thus determine an anticipated completion time of the cyberattack and perform failover before that completion time. Determining the anticipated completion time may involve determining a rate of change in performance of the computing device over a period of time, wherein the performance of the computing device is less than a threshold performance at the anticipated completion time. The anticipated completion time refers to a point in time when the effects of the cyberattack cause the performance of the device to drop below the threshold performance.

For example, the performance may be quantified based on a combination of average CPU usage, average memory usage, battery life (e.g., if a computing device is portable), a number of crashes of applications within a period of time, a number of crashes of the computing device within a period of time, a latency in accessing applications/files on the computing device compared to a normal access time, computing device hardware temperatures, etc. Security component 116 or a given security module may then extrapolate the rate of change over the period of time to determine the anticipated completion time. For example, if security component 116 is determining the performance based on average CPU usage (e.g., 86%) and a number of application crashes within the period of time (e.g., 4 crashes of 10 applications used in 24 hours), security component 116 may execute a linear combination of the values to determine a performance score. For simplicity, suppose that the linear combination places equal weights (1) on each attribute and is an average of the two values. In this case, 14% of the CPU is free and 6/10 applications have not crashed. The performance score will be (14+60)/2=37. In other aspects, a greater weight may be placed on one of the attributes. For example, the number of crashes may be set at a weight of 1.1. The performance score will thus be (14+1.1*60)/2=40. The performance threshold is a score such as 65. In this example, due to the application crashes and little CPU availability, security component 116 determines that the performance score of 37 is less than the threshold of 65.

In order to calculate the rate of change in performance, security component 116 may determine a plurality of performance scores as described above over a period of time. Security component 116 may then determine a slope of the performance scores over the period of time. For example, if the performance score at 3:00 pm is 90 and then at 3:10 pm the performance score is 80, the rate of change is −1 per minute. If the performance threshold is 65, security component 116 determines that the performance will degrade below the threshold by 3:26 pm.

In some aspects, the performance is based on a rate of encryption. For example, a ransomware may be encrypting files of data 104a at a rate of 10 files per minute. If there are 1000 files left to encrypt, a security module may determine that there remains 100 minutes until the cyberattack is complete. Within this time, the failover needs to be completed for uninterrupted access by client devices 118. In some aspects, a security module may skip hardening to keep the failover time within this time. For example, if the hardening will take 5 minutes and the cyberattack will do enough damage that the performance score will drop below the threshold in 3 minutes, the hardening is not performed.

In the case where multiple CDs are being targeted by a cyberattack, security component 116 or a plurality of security modules may communicate with each other to detect a failure rate of the plurality of computing devices, wherein all of the plurality of computing devices will fail at the anticipated completion time. For example, ransomware may be encrypting data 104a, 104b, and 104c on the CDs one at a time. The failure rate may indicate that a device fails every 30 minutes. Security component 116 may extrapolate the failure rate to determine the anticipated completion time. For example, security component 116 may determine that all three devices will fail in 90 minutes and a failover should be performed before this time.

Figure 2:
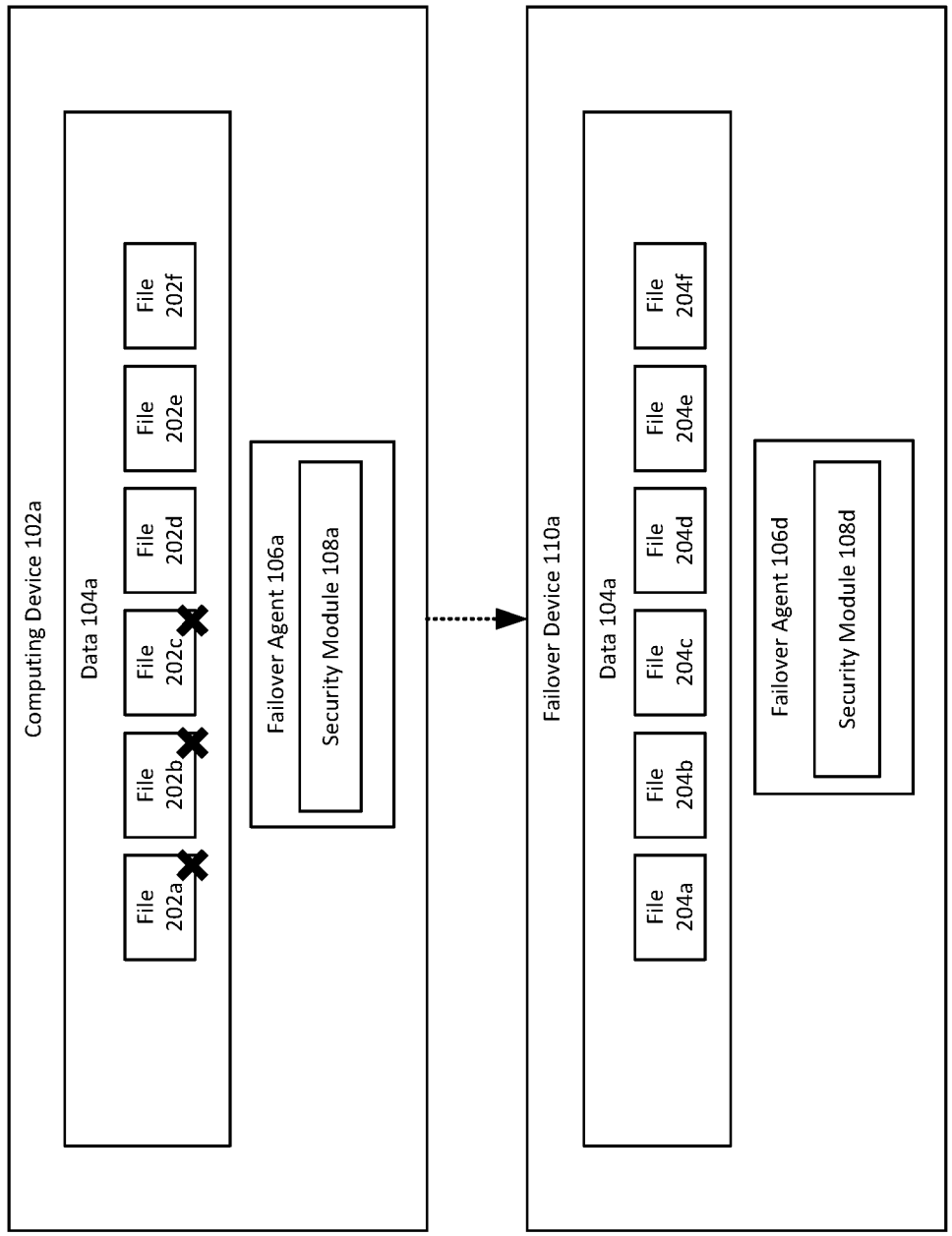
FIG. 2 is a block diagram illustrating an example of a cyberattack and failover.

FIG. 2 is a block diagram illustrating example 200 of a cyberattack and failover. Consider an example in which a malicious software is encrypting files on computing device 102a. Data 104a is made up of a plurality of files and applications. For simplicity, files 202a-f are shown. Failover device 110a comprises data 104a, which includes files 204a-f. Files 204 are identical to files 202.

Security component 116 may detect that file 202a has been encrypted by an unauthorized entity (e.g., security module 108a may detect the unauthorized encryption). In response to detecting the cyberattack, security component 116 hardens data 104a on failover device 110a. For example, security component 116 may instruct security module 108d to change access to at least file 204a as read-only or may generate a copy of at least file 204a for storage in a different location. This prevents the cyberattack from targeting failover device 110a and repeating the attack. As the hardening on computing device 102a is performed, the cyberattack on computing device 102a may be ongoing. For example, files 202b and 202c may also be encrypted. Security component 116 may concurrently activate failover to failover device 110a. As discussed previously, because the performance of the computing device has not reduced to less than the threshold performance, a user can continue to access computing device 102a. By the time the performance reduces to below the threshold performance, the failover is complete and new requests are sent to a hardened failover device 110a.

Figure 3:
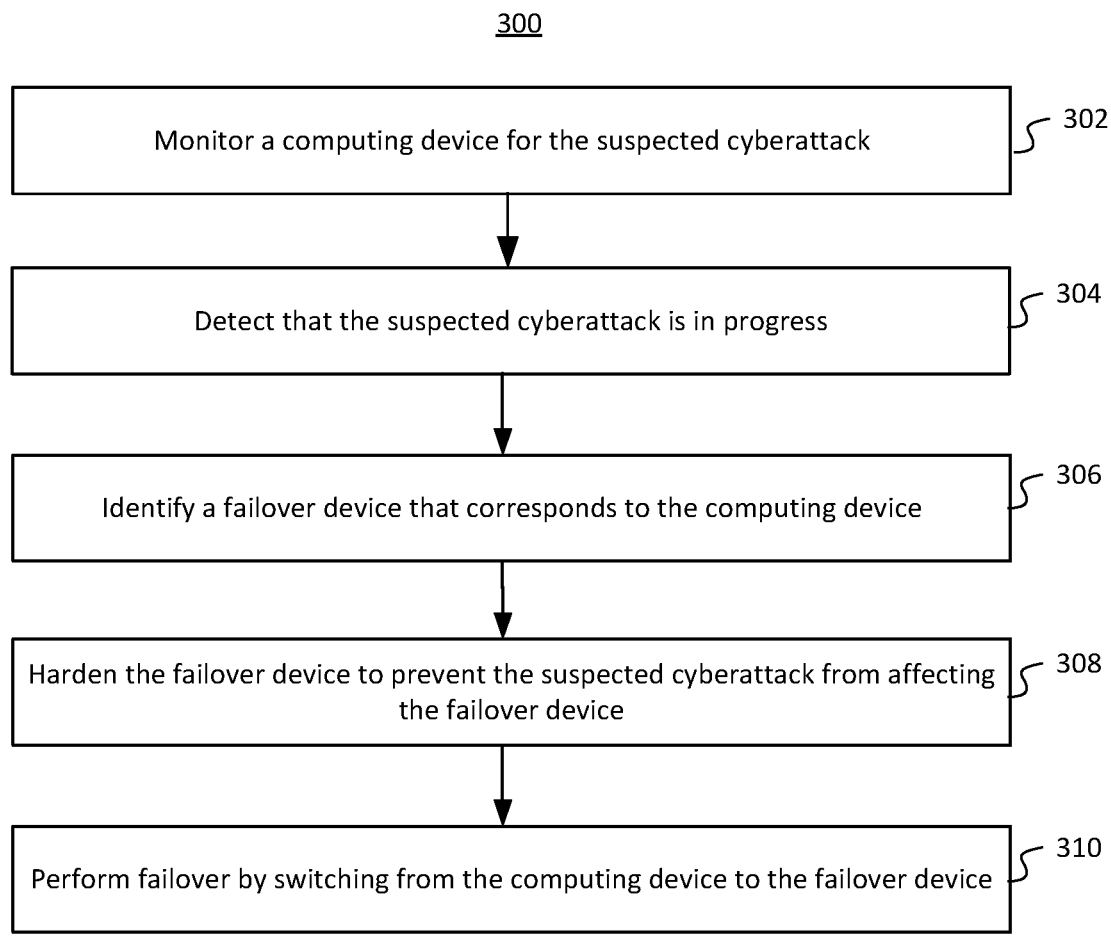
FIG. 3 illustrates a flow diagram of a method for performing failover during a cyberattack.

FIG. 3 illustrates a flow diagram of method 300 for performing failover during a cyberattack. At 302, security component 116 monitors a computing device (e.g., computing device 102a) for the cyberattack. At 304, security component 116 detects that the cyberattack is in progress. While the cyberattack is in progress, method 300 advances to 306, where failover component 114 identifies a failover device that corresponds to the computing device (e.g., failover device 110a). At 308, security component 116 hardens the failover device to prevent the cyberattack from affecting the failover device. At 310, failover component 114 performs failover by switching from the computing device (e.g., 102a) to the failover device (e.g., 110a).

Figure 4:
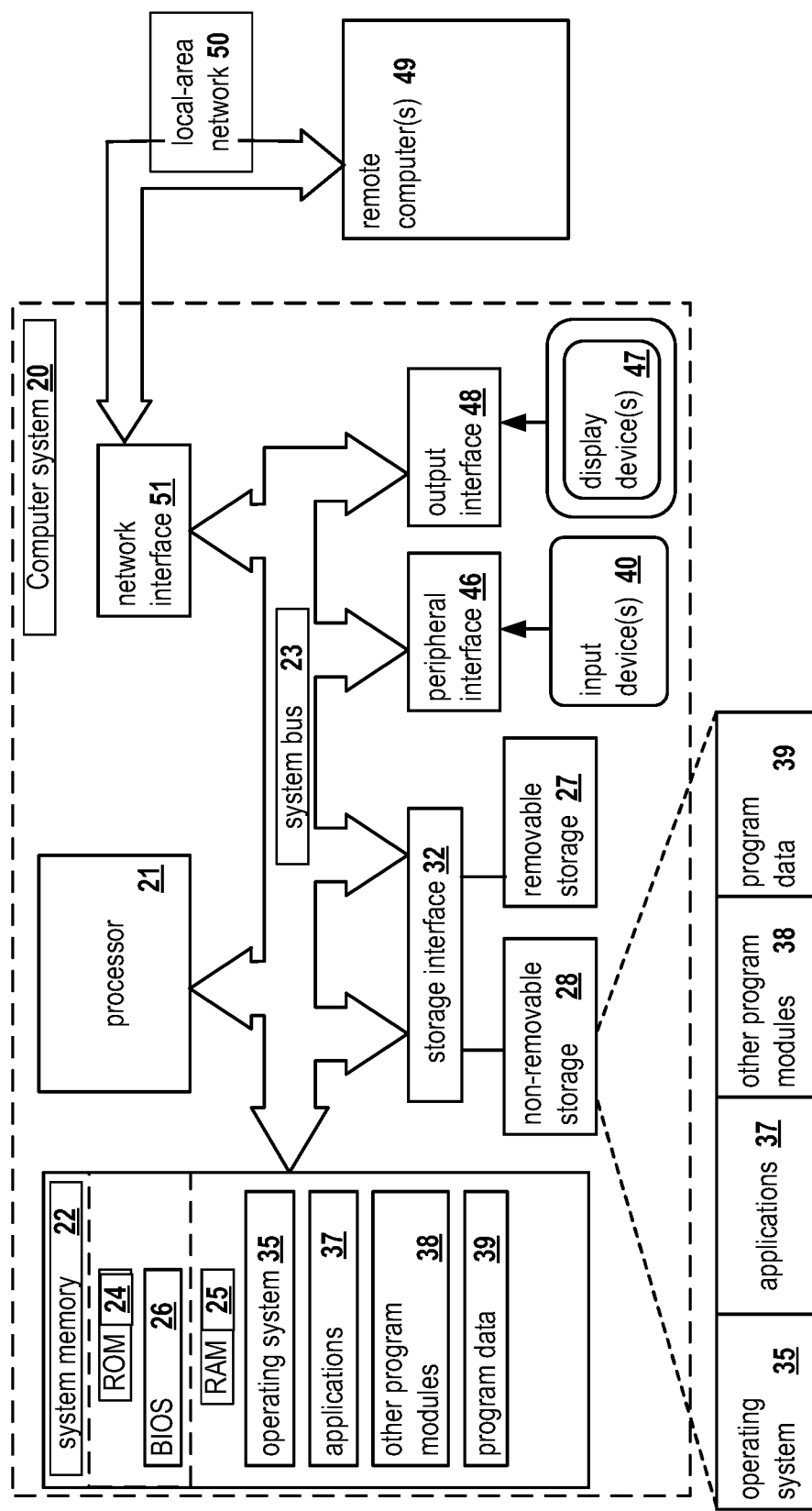
FIG. 4 presents an example of a general-purpose computer system on which aspects of the present disclosure can be implemented.

FIG. 4 is a block diagram illustrating a computer system 20 on which aspects of systems and methods for performing failover during a cyberattack may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing failover during a cyberattack, the method comprising:
monitoring a computing device for the cyberattack;
detecting that the cyberattack is in progress;
while the cyberattack is in progress,
identifying a failover device that corresponds to the computing device;
hardening the failover device to prevent the cyberattack from affecting the failover device; and
performing failover by switching from the computing device to the failover device.

2. The method of claim 1, wherein the cyberattack is targeting a plurality of computing devices comprising the computing device, further comprising:
identifying a plurality of failover devices that correspond to the plurality of computing devices;
hardening each failover device of the plurality of failover devices; and
performing the failover by switching from the plurality of computing devices to the plurality of failover devices.

3. The method of claim 1, further comprising:
determining an anticipated completion time of the cyberattack; and
completing the failover before the anticipated completion time.

4. The method of claim 3, wherein determining the anticipated completion time comprises:
determining a rate of change in performance of the computing device over a period of time, wherein the performance of the computing device is less than a threshold performance at the anticipated completion time; and
extrapolating the rate of change over the period of time to determine the anticipated completion time.

5. The method of claim 3, wherein the cyberattack is targeting a plurality of computing devices comprising the computing device, and wherein determining the anticipated completion time comprises:
detecting a failure rate of the plurality of computing devices, wherein all of the plurality of computing devices will fail at the anticipated completion time;
extrapolating the failure rate to determine the anticipated completion time.

6. The method of claim 1, wherein hardening the failover device to prevent the cyberattack from affecting the failover device comprises temporarily making the failover device read-only.

7. The method of claim 1, wherein hardening the failover device to prevent the cyberattack from affecting the failover device comprises updating an access control list (ACL) or an IP address restrictions list to prevent the cyberattack from accessing data on the failover device.

8. The method of claim 1, wherein performing the failover by switching from the computing device to the failover device comprises redirecting requests sent from a client device to the computing device to the failover device.

9. A system for performing failover during a cyberattack, the system comprising:

a hardware processor configured to:
monitor a computing device for the cyberattack;
detect that the cyberattack is in progress;
while the cyberattack is in progress,
    identify a failover device that corresponds to the computing device;
    harden the failover device to prevent the cyberattack from affecting the failover device; and
    perform failover by switching from the computing device to the failover device.

10. The system of claim 9, wherein the cyberattack is targeting a plurality of computing devices comprising the computing device, wherein the hardware processor is further configured to:
    identify a plurality of failover devices that correspond to the plurality of computing devices;
    harden each failover device of the plurality of failover devices; and
    perform the failover by switching from the plurality of computing devices to the plurality of failover devices.

11. The system of claim 9, wherein the hardware processor is further configured to:
    determine an anticipated completion time of the cyberattack; and
    complete the failover before the anticipated completion time.

12. The system of claim 11, wherein the hardware processor is further configured to determine the anticipated completion time by:
    determining a rate of change in performance of the computing device over a period of time, wherein the performance of the computing device is less than a threshold performance at the anticipated completion time; and
    extrapolating the rate of change over the period of time to determine the anticipated completion time.

13. The system of claim 11, wherein the cyberattack is targeting a plurality of computing devices comprising the computing device, and wherein the hardware processor is further configured to determine the anticipated completion time by:
    detecting a failure rate of the plurality of computing devices, wherein all of the plurality of computing devices will fail at the anticipated completion time;
    extrapolating the failure rate to determine the anticipated completion time.

14. The system of claim 9, wherein the hardware processor is further configured to harden the failover device to prevent the cyberattack from affecting the failover device by temporarily making the failover device read-only.

15. The system of claim 9, wherein the hardware processor is further configured to harden the failover device to prevent the cyberattack from affecting the failover device by updating an access control list (ACL) or an IP address restrictions list to prevent the cyberattack from accessing data on the failover device.

16. The system of claim 9, wherein the hardware processor is further configured to perform the failover by switching from the computing device to the failover device by redirecting requests sent from a client device to the computing device to the failover device.

17. A non-transitory computer readable medium storing thereon computer executable instructions for performing failover during a cyberattack, including instructions for:
    monitoring a computing device for the cyberattack;
    detecting that the cyberattack is in progress;
    while the cyberattack is in progress,
        identifying a failover device that corresponds to the computing device;
        hardening the failover device to prevent the cyberattack from affecting the failover device; and
        performing failover by switching from the computing device to the failover device.

18. The non-transitory computer readable medium of claim 17, wherein the cyberattack is targeting a plurality of computing devices comprising the computing device, further comprising instructions for:
    identifying a plurality of failover devices that correspond to the plurality of computing devices;
    hardening each failover device of the plurality of failover devices; and
    performing the failover by switching from the plurality of computing devices to the plurality of failover devices.

19. The non-transitory computer readable medium of claim 17, further comprising instructions for:
    determining an anticipated completion time of the cyberattack; and
    completing the failover before the anticipated completion time.

20. The non-transitory computer readable medium of claim 19, wherein instructions for determining the anticipated completion time further comprise instructions for:
    determining a rate of change in performance of the computing device over a period of time, wherein the performance of the computing device is less than a threshold performance at the anticipated completion time; and
    extrapolating the rate of change over the period of time to determine the anticipated completion time.

* * * * *